March 30, 1948.   C. FARROW   2,438,742
IGNITRON WELDING CONTROL
Filed Aug. 9, 1945
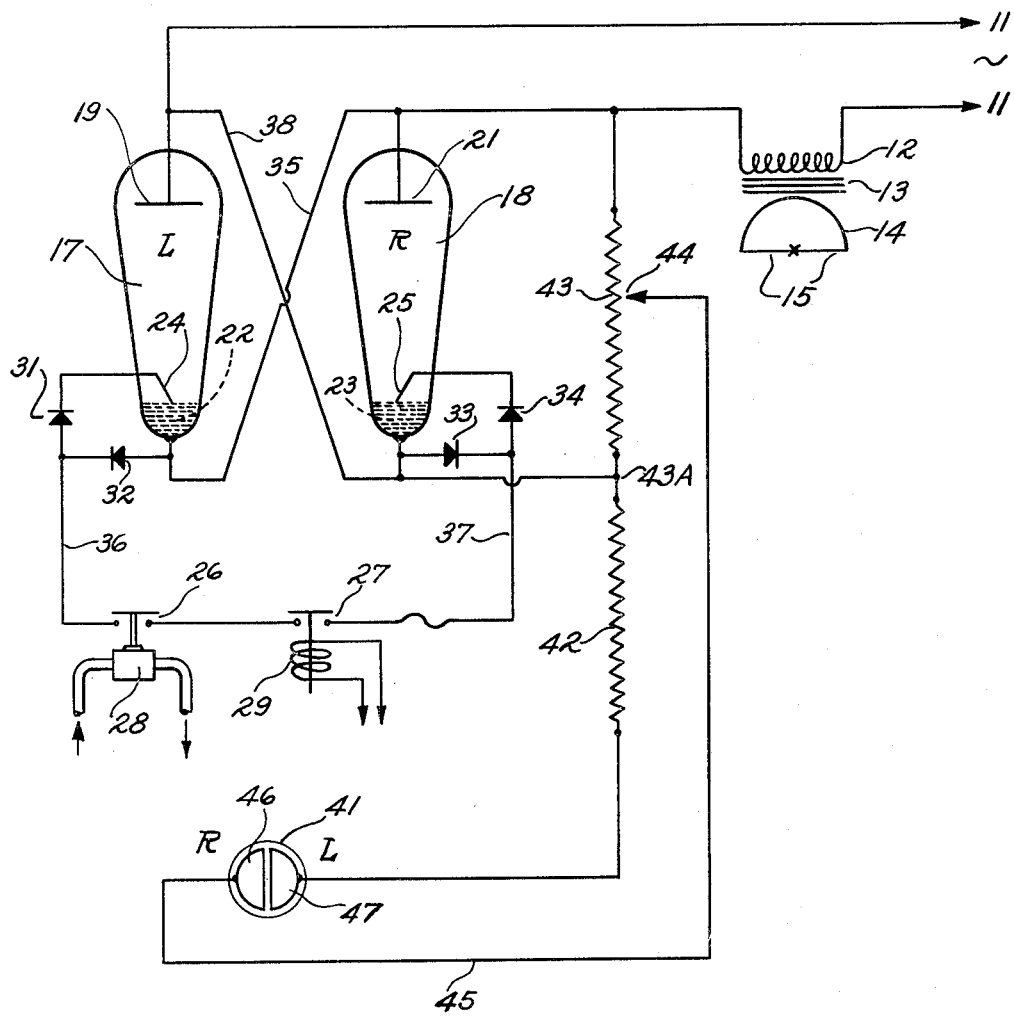
INVENTOR.
CECIL FARROW
BY Richey & Watts
ATTORNEYS Patented Mar. 30, 1948

2,438,742

UNITED STATES PATENT OFFICE 2,438,742

IGNITRON WELDING CONTROL

Cecil Farrow, Bainbridge Township, Geauga County, Ohio, assignor to Republic Steel Corporation, Cleveland, Ohio, a corporation of New Jersey Application August 9, 1945, Serial No. 609,780

7 Claims. (Cl. 177—311)

My invention relates to indicators and concerns particularly methods of checking the condition of electric discharge devices, such as those used in welding controls, for example.

It is an object of my invention to provide a simple, safe, reliable, inexpensive method and device for checking or detecting flaws in current controlling devices of the uni-lateral type.

A further object of my invention is to provide methods and apparatus for checking electric discharge devices of the uni-lateral type.

For certain purposes, loads operating from alternating current may be controlled by means of electric discharge devices connected in parallel to form a unit in series with the load to be controlled, but with polarities opposite so that the current may flow through the load on each cycle on the alternating current.

For example, certain ionic-discharge or vapor-discharge tubes, known as ignitrons, are commonly used to control resistance welding operations. Such tubes are used in pairs so that if one of the tubes becomes defective, it may cause serious overload on the power lines and may also damage the other tube. The tubes are relatively expensive and it is desirable to replace an ignitron tube as soon as it begins to show signs of not operating correctly.

It is, accordingly, an object of my invention to provide simple means for indicating when one tube has become dangerous to operate in order that it can be replaced before the other tube has become damaged.

It is understood that determining the condition of a tube by measurement of what is called igniter resistance is an unreliable test owing to the fact that tube failures may occur even when the igniter resistance remains normal. When a tube fails in service, it is difficult to determine readily which tube it is. Such tubes ordinarily operate at relatively high voltage, and are enclosed in a cabinet, making it difficult to observe whether or not the tubes are glowing; furthermore, since the tubes may glow intermittently, it is impossible to determine which one is defective unless a view into the interior of an opened cabinet (a dangerous performance) is obtained at exactly the right moment.

It is, accordingly, an object of my invention to provide means for checking current-controlling tubes in welding circuits, avoiding the hazards of opening and closing the cabinet during operation, or coming in contact with high voltage, as well as providing greater certainty as to whether or not a defect is present.

Other and further objects, features and advantages will become apparent as the description proceeds.

In carrying out the invention in accordance with a preferred embodiment thereof in connection with a pair of ignitron tubes, connected in parallel opposition as a unit in series with a welding transformer in an alternating-current circuit, I provide a potentiometer connected across the ignitrons with a symmetrical type of glow lamp or gaseous discharge tube, connected through a resistor to the adjustable tap of the potentiometer. I adjust the potentiometer so that the peak voltage across the ignitrons when operating properly is insufficient to illuminate the glow lamp, but the glow lamp becomes illuminated in case either of the ignitrons fail to conduct current. If only one of the ignitrons fails to conduct, voltage of a given polarity will be applied to the glow lamp, and a glow will appear only at one of the electrodes thereof, so that by observing which of the electrodes of the glow lamp has a glow about it, one may determine which of the ignitrons has failed.

A better understanding of the invention will be afforded by the following detailed description considered in conjunction with the accompanying drawing, the single figure of which is an electric circuit diagram schematically illustrating an embodiment of my invention.

Referring to the drawing, in the arrangement shown by way of illustration, there is a source of alternating current 11 for supplying electrical energy to the primary winding 12 of a welding transformer 13, having a single turn secondary winding 14 supplying power to a pair of welding electrodes 15. Means are provided for controlling the flow of current to the primary winding 12 of the welding transformer 13. For this purpose, it has been customary to employ electric discharge devices of the unilateral type connected in parallel with electrodes of opposite polarity connected together, the parallel unit being connected in series with the primary winding 12. In one form of such apparatus known to those skilled in the art, the current-controlling devices comprise ignitrons 17 and 18 having anodes 19 and 21 and mercury pool cathodes 22 and 23, respectively. The anode 21 is connected to the cathode 22 and the anode 19 is connected to the cathode 23. The unit comprising the two ignitrons 17 and 18 is connected in series with the primary winding 12 and the alternating current source 11.

In order to handle the heavy currents involved, such tubes 17 and 18 are ordinarily of the water-cooled type. For simplicity in the drawing, however, the water-cooling arrangements are omitted from the drawing.

For rendering the ignitron tubes 17 and 18 conductive, control electrodes, in this case igniter electrodes 24 and 25 respectively, are provided. The igniter electrodes 24 and 25 are included in control circuits including water flow relay contacts 26 and control relay contacts 27. The water flow relay contacts 26 are responsive to flow of water through a mechanism 28 so that the contacts 26 are opened whenever the flow of water through the mechanism fails. The remainder of the water cooling circuit for the tubes 17 and 18 is omitted for the sake of simplicity in the drawing.

Likewise, the control relay contacts 27 have an operating winding 29 for closing the contacts 27 in response to operation of a push button, foot pedal, timing circuit, or the like, the specific circuits for operating the winding 29 not being shown, as they do not constitute a part of my present invention.

For rendering the igniter electrodes 24 and 25 selectively responsive to any control voltage of a single polarity at a given time, rectifiers such as dry rectifiers 31, 32, 33, 34 are provided. Thus the control circuit for energizing the igniter electrode 25 comprises a connection 35 from the anode 21, the rectifier 32, the conductor 36, the normally-closed contacts 26 and 27, a conductor 37 and the rectifier 34. Similarly, the control circuit for the igniter electrode 24 comprises a connection 38 from the anode 19, the rectifier 33, the conductor 37, the normally-closed contacts 27 and 26, the conductor 36 and the rectifier 31.

The apparatus insofar as heretofore described does not in itself constitute my invention.

If the voltage source 11 is disconnected, or if either of the contacts 26 and 27 is open, the igniter electrodes of neither of the ignitron tubes 17 nor 18 will be energized and neither of the tubes will become conducting. Thus a mere failure of any glow discharge to take place in the tubes 17 and 18 does not necessarily indicate that either of them is defective. On the other hand, I have discovered that, if one or the other of the tubes should become defective, current will fail to flow through it and the voltage across it will become excessive when the source 11 is energized and the contacts 26 and 27 are closed. If either of the tubes should become defective, since it fails to conduct current, there will be an absence of glow in the defective tube whether the alternating current source is connected or not, and whether or not the relays 26 and 27 are closed. However, this cannot be ascertained with the safety cabinet closed.

In order to make it possible to ascertain safely and reliably which of the tubes 17 or 18 has become defective, or to indicate whether either of them has become defective, I provide a glow lamp 41. It is so connected as to be energized in series with an impedance such as resistor 42 from voltage existing across the electrodes of the tubes 17 and 18 when either of them becomes defective. Preferably, a potentiometer 43 is provided, comprising a resistance connected across the electrodes of the tubes 17 and 18. The potentiometer 43 is provided with an adjustable tap 44 to which the glow lamp 41 is connected through a conductor 45 in series with the resistor 42. The resistor 42 is connected to one of the end terminals 43—a of the potentiometer 43.

Preferably, the glow lamp 41 is of the symmetrical type—that is, a lamp having a pair of similar electrodes 46 and 47 spaced apart and symmetrically arranged in an enclosing envelope of glass, or other suitable transparent or translucent material filled with an inert gas such as neon at an appropriate pressure. The glow lamp 41 may be mounted at a distance from the control panel in which the electron tubes 17 and 18 are mounted, so that the lamp 41 may be observed conveniently by the welding operator or attendant. Preferably the glow lamp 41 is mounted in such a position that the electrode connected to one terminal, for example the terminal 43—a of the potentiometer 43, is located in a fixed position, for example to the left, and the electrode 46 connected to the adjustable tap 44 is located in an opposite position, for example to the right.

Where the apparatus is supplied by a current source 11 having a relatively high voltage, the arc drop between the electrodes of the ignitron tubes 17 and 18 even during normal operation thereof may be sufficient to cause illumination of the glow lamp 41 if the voltage across the ignitron terminals is applied directly to the glow lamp 41. For this reason, the tap 44 of the potentiometer 43 is so adjusted that the proportion of the voltage between the ignitron electrodes applied to the glow lamp electrodes is insufficient to cause illumination of the lamp 41 during normal operation when the ignitron tubes 17 and 18 are conducting current. The proportion of the voltage supplied by the tap 44 is made high enough, however, so that as soon as the current fails in either of the ignitron tubes 18 or 17, the potential difference between the electrodes will be sufficient to cause an illuminating voltage to be applied to the glow lamp 41.

If the current source 11 should become disconnected, of course, no voltage will be applied to the welding apparatus or to the glow lamp 41, and it will remain dark. If, for any reason, the relays 26 or 27 should remain open when voltage is supplied by the current source 11, neither ignitron tube 17 or 18 will conduct current, but full voltage will appear between the electrodes thereof, voltage will be applied to the glow lamp 41 during both half cycles of the alternating current and glow discharge will appear in the vicinity of both electrodes 46 and 47 of the glow lamp 41. This action will indicate to the operator that the electrical conditions are improper so as to cause the relay contacts 27 to remain open continuously, or that the cooling water supply for the tubes 17 and 18 has failed, causing the contacts 26 to remain open.

However, if one of the tubes 17 or 18 should become defective during the half cycle when that tube would normally be conducting current, full voltage will appear across potentiometer 43 and one of the electrodes 46 or 47 of the glow lamp 41 will be energized and caused to glow. Unless the contacts 26 or 27 open that electrode will glow continuously. Thus, continuous glowing of one of the electrodes of the tube 41, while the other electrode remains dark or glows only intermittently in response to intermittent operation of one of the contacts 26 or 27, indicates failure of one of the tubes 17 or 18. For convenience in identifying which ignitron tube has failed, the lamp electrodes 46 and 47 are marked "R" and "L," respectively, corresponding to the electrodes of the ignitron tubes 17 and 18. Thus, when the lamp electrode 47 marked "L" glows, there is an indication that the ignitron tube 17 marked "L" has failed.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What is claimed is:

1. A fault indicator for an ignitron welding control of the type having two ignitron tubes connected in parallel with opposite polarities in a welding-current supply circuit, said indicator comprising a gaseous discharge glow lamp having a pair of substantially similar electrodes, an impedance connecting said glow lamp across said ignitron tubes, and means for adjusting the voltage applied to the glow lamp to such a value as to cause the glow lamp to become illuminated only when substantially the full voltage of the supply circuit is present across the ignitron tubes, and one or the other of said electrodes has the glow adjacent to it according to which of said ignitron tubes fails to conduct current.

2. A fault indicator for electric discharge tubes connected in parallel with opposite polarities comprising a glow lamp having substantially similar electrodes, means for applying to said glow lamp current derived from voltage existing across said discharge tubes, and means for adjusting the proportion of the voltage across said discharge tubes applied to said glow lamp for preventing illumination of said glow lamp by the voltage existing across said discharge tubes when such discharge tubes are conducting current, whereby the failure of one or the other of said discharge tubes to conduct current, raising the voltage thereof, is indicated by the presence of a glow in proximity to one or the other of the electrodes of said glow lamp, and the absence of discharge current in both of said discharge tubes is indicated by glow in proximity to both the electrodes of said glow lamp.

3. A fault indicator for electric discharge tubes connected in parallel with opposite polarities, said indicator comprising a glow lamp having substantially similar electrodes, and means for applying voltage to said glow lamp in response to the presence of voltage across said discharge tubes, whereby the failure of either of said discharge tubes to conduct current causing a greater voltage in the connection across said discharge tubes, results in application of sufficient voltage to said glow lamp to cause illumination thereof, and one or the other of said electrodes of the glow lamp has the glow adjacent to it according to which of said discharge tubes fails to conduct current.

4. In combination, a source of alternating voltage, a load, a pair of control devices of the unilateral type connected with opposite polarities in parallel with each other in a unit, connected in series with said load, whereby the failure of current to flow through either of said discharge devices results in rising potential across the connection to said control devices, a glow lamp having a pair of substantially similar electrodes, and conductors connecting said glow lamp to the connection of said control devices, whereby failure of either of said control devices to conduct current applies a voltage to said glow lamp causing it to become illuminated, and one or the other of said electrodes has the glow adjacent to it according to which of said unilateral control devices fails to conduct current.

5. A fault indicator for electric discharge devices of the unilateral type, connected in parallel with opposite polarities, said indicator comprising a glow lamp having a pair of substantially similar electrodes and means for applying to said glow lamp voltage existing across said discharge devices whereby failure of either of said discharge devices to conduct current results in a rise in voltage thereacross and the illumination of said glow lamp, with one or the other of said electrodes glowing according to which of said unilateral discharge devices fails to conduct current.

6. A fault indicator for electric discharge tubes connected in parallel with opposite polarities, said indicator comprising a glow lamp and means for applying voltage to said glow lamp in response to the presence of voltage across said discharge tubes, whereby the failure of either of said discharge tubes to conduct current causes a greater voltage in the connection across said discharge tubes results in application of sufficient voltage to said glow lamp to cause one or the other electrodes of said glow lamp to glow, said glow lamp being positioned physically so that the glow indicates the position of the faulty tube.

7. A fault indicator for a pair of current controlling devices of the uni-lateral type, connected with opposite polarities, in parallel with each other in a unit, connected in series with a current source, said indicator comprising a glow lamp having a pair of substantially similar electrodes in a gaseous medium, and means for applying voltage to said glow lamp in response to the presence of voltage across said control devices, whereby the failure of either of said devices to conduct current, causing a greater voltage in the connection across said devices, results in the application of sufficient voltage to said glow lamp to cause one or the other of said electrodes to glow according to which of said unilateral current-controlling devices fails to conduct current.

CECIL FARROW.

REFERENCES CITED

The following references are of record in the file of this patent:

UNITED STATES PATENTS

| Number | Name | Date |
|---|---|---|
| 2,278,516 | Gulliksen | Apr. 7, 1942 |
| 2,326,313 | Trucksess | Aug. 10, 1943 |
| 2,367,509 | Knowlton | Jan. 16, 1945 |